United States Patent [19]

Kramer

[11] Patent Number: 4,667,460
[45] Date of Patent: May 26, 1987

[54] ELECTRIC LAWN MOWER WITH SELF COILING POWER CORD

[76] Inventor: Joseph Kramer, 19 Brandeis Cir., Newton, Mass. 02159

[21] Appl. No.: 819,584

[22] Filed: Jan. 17, 1986

[51] Int. Cl.⁴ ............... A01D 34/64; A01D 34/82; H02G 11/00; H01B 7/06
[52] U.S. Cl. ............... 56/17.5; 174/69; 174/135; 180/19.1; 191/12 R
[58] Field of Search ............... 174/69, 135; 15/DIG. 10; 56/16.7, 17.1, 17.4, 17.5, DIG. 20, 16.8, 16.9, 17.2, 17.3, 17.6; 191/12 R; 248/51, 52; 339/28; D13/28; 180/19.1, 19.2, 19.3

[56] References Cited

U.S. PATENT DOCUMENTS

| D. 256,581 | 8/1980 | Bartin | D13/28 |
|---|---|---|---|
| 1,937,981 | 12/1933 | Rosenthal | 174/69 |
| 2,081,928 | 6/1937 | Hay | 174/69 |
| 2,263,431 | 11/1941 | White | 56/17.5 X |
| 2,498,609 | 2/1950 | Reil | 180/19.1 X |
| 2,592,856 | 4/1952 | Brockman | 180/19.1 |
| 2,913,791 | 11/1959 | Martin | 174/135 |
| 3,246,075 | 4/1966 | Dansand | 191/12 R X |
| 3,538,484 | 11/1970 | Passafiume | 174/69 X |

FOREIGN PATENT DOCUMENTS

| 568619 | 6/1968 | Belgium | 56/17.5 |
|---|---|---|---|
| 1108250 | 4/1968 | United Kingdom | 174/135 |

*Primary Examiner*—Laramie E. Askin
*Attorney, Agent, or Firm*—Russell & Tucker

[57] ABSTRACT

An electric lawn mower and power cord combination in which the power cord has a central portion that is self-coiling. This central portion of the cord comprises the predominant length of the cord, and is constructed with an elastic memory, so that, when in its relaxed state, it automatically coils itself into a continuous spiralling helix that is too large to pass under the electric lawn mower. A cord grip is also disclosed that locks the cord to a stationary object to prevent the cord from inadvertently becoming disconnected during use.

4 Claims, 4 Drawing Figures

ELECTRIC LAWN MOWER WITH SELF COILING POWER CORD

BACKGROUND OF THE INVENTION (1) Field of the Invention

The present invention relates to an electric lawn mower and power cord combination, and more particularly to an electric lawn mower having a cord adapted so that the lawn mower cannot run over and damage the cord.

(2) Background Art

With suburban yards being relatively small, and neighbors being relatively close, electric lawn mowers have become quite popular. They have the advantage of being considerably quieter than their gas powered counterpart, and they eliminate the inconvenient tasks of purchasing and storing fuel.

Although electric lawn mowers have the above advantages, they suffer from the distinct disadvantage of having a long cumbersome cord attached to them. The operator of an electric lawn mower must constantly be aware of the cord, and must perform intricate cord handling techniques at each turn in oder to avoid running over the cord with the lawn mower. Running over the cord must be avoided at all extremes, since doing such usually results in the destruction of the cord and a loss of power to the lawn mower. In addition, running over the cord presents a potentially dangerous electric shock hazard to the operator.

The prior art electric cords useable with an electric lawn mower are generally of a straight, heavy, and lifeless construction. The cord preferably contains thick wires to allow adequate conduction of electricity. The prior art cords frequently include a ground wire for safety, which also adds to the weight and uncontrollability of the cords.

These prior art cords are thin enough so that an electric lawn mower may easily pass over them, yet obtrusive enough so that should a lawn mower pass over one, there is a sufficient likelihood that the lawn mower blade will strike the cord and thus create the problems discussed above.

A further problem with the prior art electrical cords is that they are difficult to store. Because of their basically straight construction, they are difficult to wind or coil. Thus, such a cord frequently becomes kinked or tangled within itself.

The straight construction of the prior art electric lawn mower cords results in the cords lying in an aimless snake-like path between the lawn mower and the electric outlet whereby the cords are easily snagged on trunk stumps or other yard-residing obstacles.

OBJECTS AND SUMMARY OF THE INVENTION

In view of the foregoing limitations and shortcomings of the prior art devices, as well as other disadvantages not specifically mentioned above, it should be apparent that there still exists a need in the art for a lawn mower and electric power cord combination wherein the cord is of a construction that resists being run over by the lawn mower and is easy to use and store.

It is, therefore, a primary object of this invention to provide an electric lawn mower with a cord that is resistant to being run over by the lawn mower.

It is yet another object of this invention to provide a lawn mower with an electric cord that is automatically pushed away from the lawn mower when the lawn mower approaches the electric cord.

Still anther object of the present invention is to provide a lawn mower with a self-retracting electric cord that is easy to handle when in use.

It is still anther object of the present invention to provide an electric lawn mower with a cord that is easy to coil up and store.

Briefly described, those and other objects are accomplished according to the present invention by providing an electric lawn mower with a cord that has a central portion that is self-coiling. This central portion of the cord comprises the predominant length of the cord, and is constructed so that, when in its relaxed state, it automatically coils itself into a continuous spiralling helix. The exact diameter of the helix is not critical, the determinative criterion being that the helix is too large to pass under an electric lawn mower.

The end of the cord that is plugged into an electric power source is not in danger of being run over and thus need not be coiled. That end could thus comprise about ten feet of straight wire cord. The last few feet of the other end of the cord that connects to the lawn mower also does not need to be coiled since that end is also not in danger of being run over by the lawn mower.

A specifically designed cord grip allows the cord to be tensioned without becoming unplugged.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

A preferred embodiment of the invention is illustrated in the accompanying drawings in which.

DETAILED DESCRIPTION OF A PREFERRED EMBODIMENT

Figure 1:
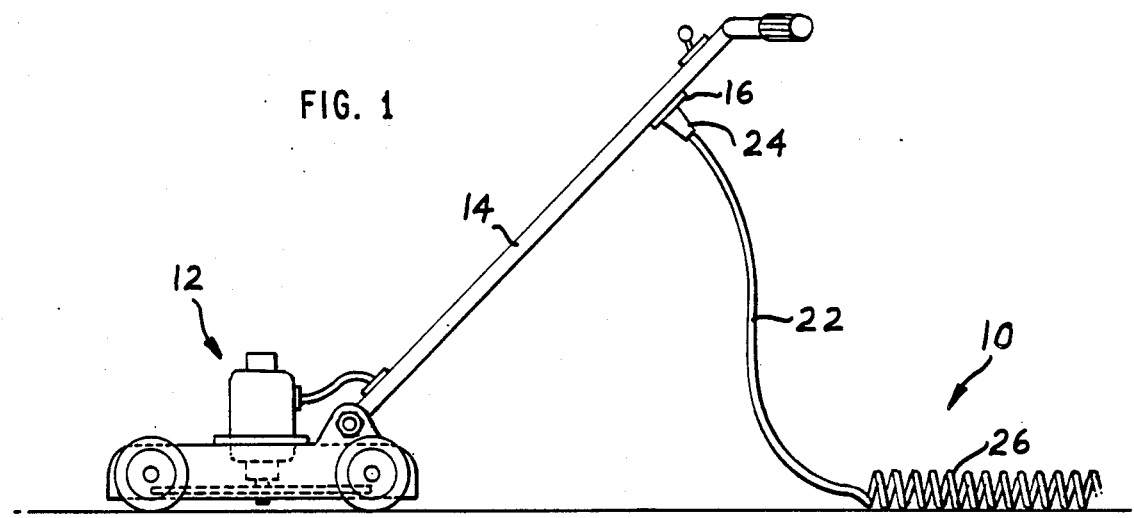
FIG. 1 is a view in side elevation of an electric lawn mower with an electric cord according to the present invention.

Referring now in detail to the drawings wherein like parts are designated by like reference numerals throughout, there is illustrated in FIGS. 1-4 an electric cord accoding to the present invention designated generally by reference numeral 10. FIG. 1 shows a conventional electric lawn mower 12 having a handle 14, at the upper end of which is located a connector 16 for an electric power cord.

Figure 2:
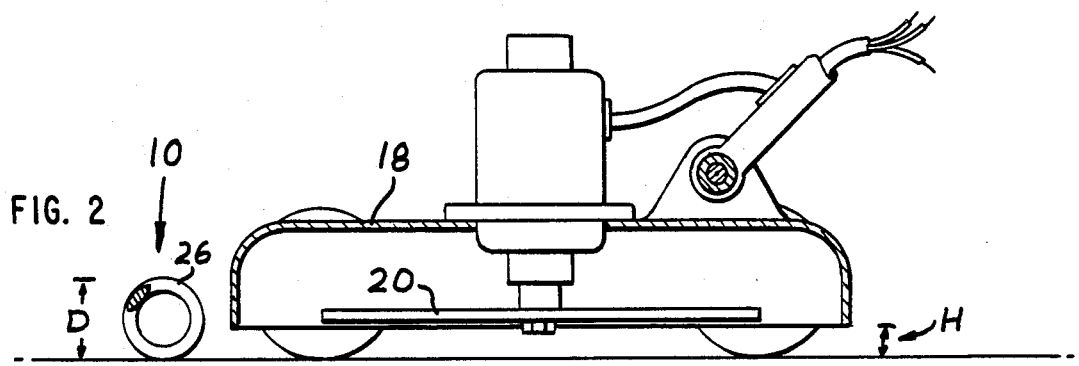
FIG. 2 is a more detailed view in side elevation of an electric lawn mower and a portion of an electric cord according to the present invention located before it.
Figure 3:
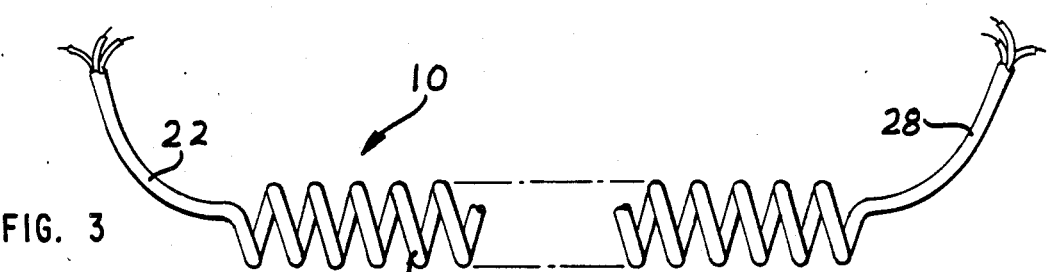
FIG. 3 is a view of an electric lawn mower cord according to the present invention.

As seen more clearly in FIG. 2, the electric lawn mower has a chassis 18 for housing the mower blade 20. There is a gap having a height H between the ground and the bottom of the chassis 18. The height of the gap is usually adjustable, depending upon the desired length of the cut grass. A common problem with prior art lawn mower cords is that they are able to pass through this gap underneath the chassis 18 where they are easily damaged by the blade 20.

In accordance with the present invention, the cord 10 comprises a first portion 22 that is about four feet long. This portion is made of substantially straight wire and has an electrical connector 24 at one end for engaging with the connector 16 on the lawn mower 12. It is preferable that the length of the first portion be short enought such that no part of it is able to pass under the lawn mower, i.e., the first portion should be shorter that the distance between the connector 16 and the lawn mower blade 20.

In the central portion 26 of the cord 10, the cord is constructed with an elastic memory so that in its relaxed state, it automatically coils itself into a continuous helix.

The exact diameter D of the helix is not critical, the determinative criterion being that the helix should be too large to fit through the gap between the chassis 18 and the ground and thus pass under an electric lawn mower. Since most electric lawn mowers are adjustable such that the distance between the blade and the ground may be varied, the cord helix diameter should be large enough to prevent the cord from passing under the lawn mower when the lawn mower is adjusted with the blade at its highest level.

In operation, if the lawn mower 12 should strike the cord 10, the coils of the helix will simply bounce off the chassis 18 and roll out of the way of the lawn mower 12.

The coiled portion of the cord can be manufactured in the same way that the coiled wire connecting a standard telephone receiver and its base is made. The insulation of the coiled portion of the cord can be extruded out of an appropriate material such as polyvinyl chloride or polyurethane through a die designed to impart such a coil into the plastic. The helical shape is thus incorporated into the plastic insulation, not the wire itself. Other possible modes of manufacture might include incorporating a precoiled stiffening element within the insulation to give it the required coil, or to stress the conductive wire itself so that it remains coiled when in its relaxed state.

The last portion 28 of the cord is about ten feet long and, like the first portion 22, is comprised of a substantially straight section of cord. A standard plug 30 is mountd at one end of the portion 28 for plugging into a conventional electric outlet 32.

While the lawn mower is near the outlet 32, the central portion 26 of the cord remains coiled in its relaxed state, and thus out of the way of the lawn mower 12. As the lawn mower is moved farther from the outlet, the helical central portion of the cord 10 is straightened, increasing the effective length of the cord 10. When the lawn mower 12 is moved back near the outlet 32 again, the elastic memory in the cord causes the cord to automatically recoil itself back into a spiralling helix.

Figure 4:
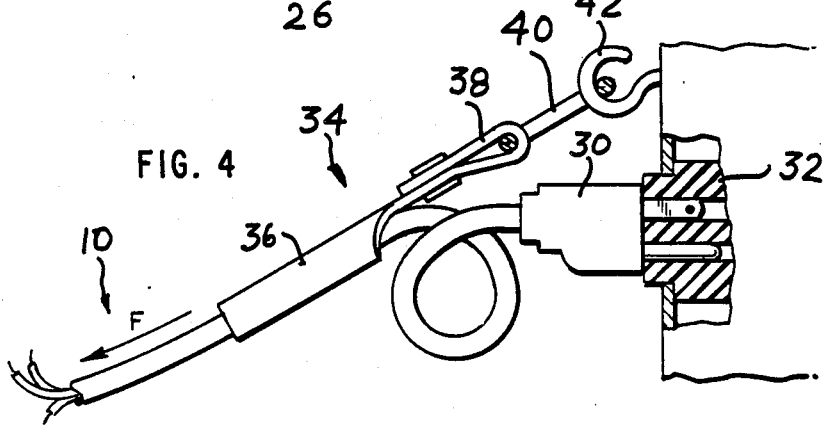
FIG. 4 is a view of one end of an electric cord accoding to the present invention showing an attachment means.

Such a straightening of the cord 10 applies a force F to the cord 10, which has a tendency to pull the plug 30 from the outlet 32. To overcome this force F, a cord grip 34 is fastened to the cord as shown in FIG. 4.

The cord grip 34 includes a collar 36 which locks onto the cord 10 so as to prevent relative movement between the cord 10 and the collar 36. Extending from the collar 36 is an eye 38 that engages either directly, or through an intermediate ring 40, with a hook 42 mounted on a stationary object adjacent the electric outlet 32. Accordingly, as the lawn mower is moved away from the outlet 32, force F is absorbed by the cord grip 34 and hook 42 to prevent the plug 30 from being pulled out of the outlet 32. A similar cord grip can also be used at the other end of the cord 10 to retain the connectors 16 and 24 together during operation of the mower.

The cord grip 34 could be used on other electric appliances besides an electric lawn mower, if desired.

Although only preferred embodiments are specifically illustrated and described herein, it will be apreciated that many modifications and variations of the present invention are possible in light of the above teachings and within the purview of the appended claims without departing from the spirit and intended scope of the invention.

What I claim is:

1. A lawn mower and power cord combination comprising:
    a chassis for said mower, said chassis having a lower rim,
    wheels for supporting said rim above the ground by a dimension H,
    a power cord for said mower having a central portion formed into a spring helix construction and arranged to allow the cord to be pulled out to a relatively straight line and, when released, to spring back to the helix shape, and
    the diameter of the helix of said central portion being substantially greater than the dimension H;
    whereby movement of the rim of said chassis against said central portion lying on the ground ahead of said mower causes said rim to push away said cord.

2. The lawn mower and power cord combination of claim 1, further characterized by:
    a push handle for said mower;
    means on said push handle for attaching said power cord thereto, and
    a first section of said cord dimensioned to approximate the distance between the location of said attaching means and said rim, said first section attached to said handle and its other end integral with the near end of said central portion.

3. The lawn mower and power cord combination of claim 2, further characterized by:
    a second section of said cord at the end of said central portion remote from said first section about ten feet in length.

4. The lawn mower and power cord combination of claim 3, further characterized by:
    a plug for connecting the end of said second section to an electrical outlet, and
    releasable means for retaining said plug engaged in said outlet despite tension on said cord.

* * * * *